United States Patent [19]

Huffman

[11] 4,091,689
[45] May 30, 1978

[54] PLANETARY STEERING HUB ASSEMBLY

[75] Inventor: Roger B. Huffman, Chanhassen, Minn.

[73] Assignee: Dana Corporation, Toledo, Ohio

[21] Appl. No.: 719,814

[22] Filed: Sep. 1, 1976

[51] Int. Cl.² .......................... F16H 3/44; F16H 35/00
[52] U.S. Cl. ........................ 74/785; 74/391; 74/801; 180/43 B
[58] Field of Search .................. 74/391, 785, 801; 180/43 B

[56] References Cited

U.S. PATENT DOCUMENTS

| | | | |
|---|---|---|---|
| 2,801,702 | 8/1957 | Armington | 180/43 B |
| 2,858,897 | 11/1958 | Sibley | 180/43 B |
| 3,150,532 | 9/1964 | Bixby | 74/801 X |
| 3,295,624 | 1/1967 | Lee et al. | 180/43 B |
| 3,469,647 | 9/1969 | Brown | 180/43 B |
| 4,010,830 | 3/1977 | Logus et al. | 74/785 X |

*Primary Examiner*—Samuel Scott
*Assistant Examiner*—Carl F. Pietruszka
*Attorney, Agent, or Firm*—Warren A. Sturm; Hugh D. Jaeger

[57] ABSTRACT

A planetary gear steering hub assembly which can be easily assembled and disassembled. The assembly includes a stationary axle housing, a universally jointed axle shaft extending through the housing, and a hollow spindle having an inner end with integrally formed knuckles pivotally coupling it to the axle housing and having adjacent its outer end an integrally formed toothed ring surrounding but spaced from the sun gear. A hub is rotatably mounted to and carried coaxially of the spindle, the hub carrying a plurality of rotatable planet gears disposed between the sun gear and the toothed ring and meshing therewith.

7 Claims, 4 Drawing Figures

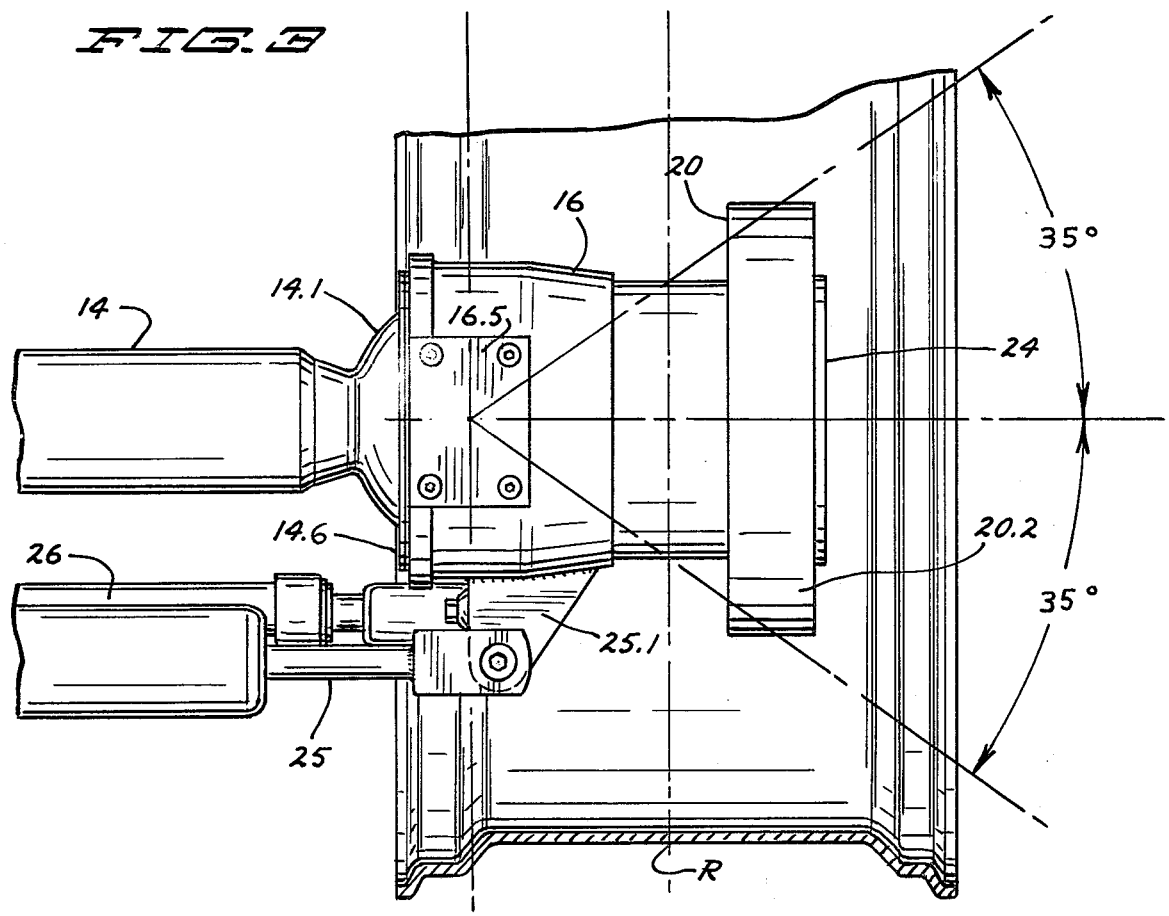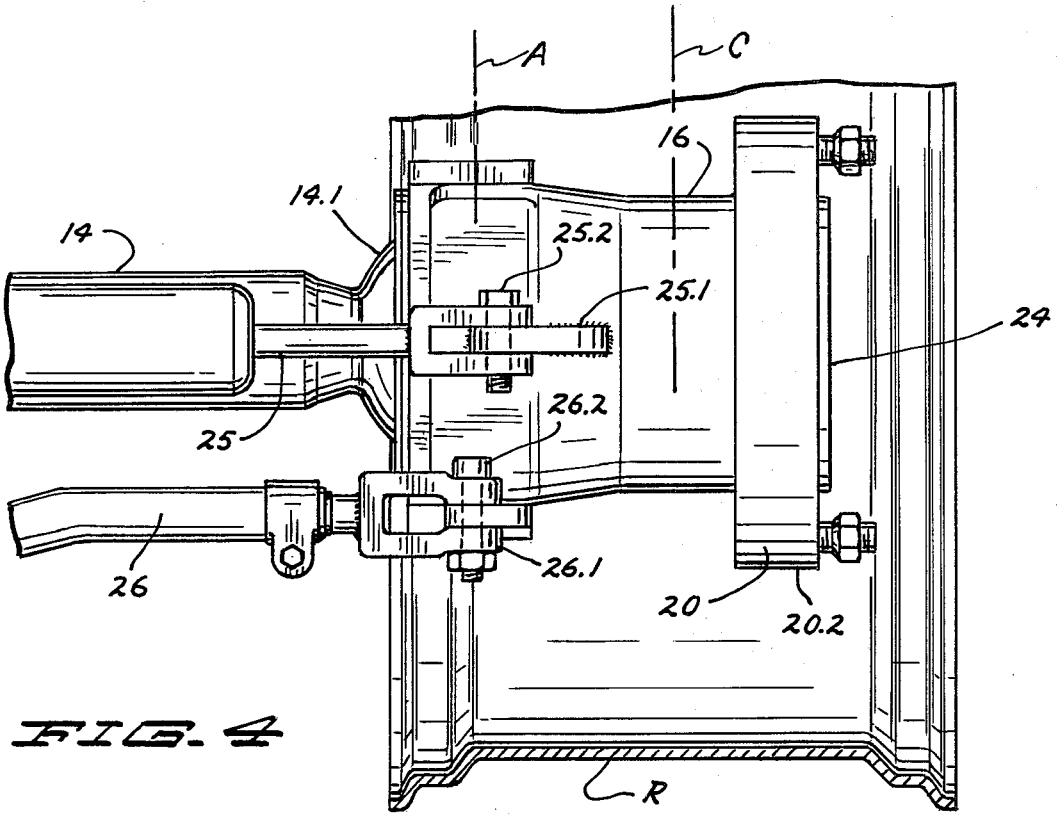

4,091,689

PLANETARY STEERING HUB ASSEMBLY

BACKGROUND OF THE INVENTION

The present invention relates to a planetary steering hub assembly particularly useful for vehicles in which driven wheels must be steered.

Planetary transmissions, which may be disposed at the ends of drive axles, are generally known and have commonly been used for heavy-duty vehicles such as trucks and construction machinery. Their use minimizes the torque which must otherwise be transmitted and carried by the differentials and axle shafts of such vehicles. Such planetary transmissions have generally been mechanically complex and expensive, and have accordingly not only added considerably to the cost of heavy-duty vehicles but have been difficult to repair or replace. Because of the advantages obtainable from planetary transmissions at the ends of drive axles, it would be desirable to provide a relatively inexpensive planetary gear assembly capable of being easily assembled and disassembled, and it would be particularly desirable to provide such an inexpensive transmission assembly which would permit the hub to be steered without requiring large steering forces not involving large horizontal swinging movement of a tire during a turning operation.

SUMMARY OF THE INVENTION

The present invention provides a planetary steerable hub assembly which has comparatively few parts, and which can be easily taken apart and reassembled when repair or replacement of parts becomes necessary. The assembly includes a stationary axle housing, and an axle shaft extending through the housing and having a universal joint spaced from its outer end to define a pivotal outer shaft end portion. A sun gear is coaxially mounted to the outer end of the axle shaft. A hollow, integrally formed spindle body is provided with diametrically opposed knuckles at its inner end through which the spindle is pivotally attached to the axle housing for pivot movement about a generally vertical axis, the spindle knuckles being generally radially aligned with the universal joint of the axle shaft. The unitary integral nature of the spindle having opposed knuckles permits the pivotal axis of the attachment of the spindle to the axle housing to be closely spaced to the center line of the tire track, thereby promoting ease of steering and providing minimum horizontal swinging movement of a tire.

The inner surface of the spindle adjacent its outer end is provided with a ring of teeth integrally formed therein and surrounding but spaced from the sun gear. A hub is rotatably mounted to and is carried coaxially of the spindle, the hub extending outwardly of the spindle and carrying a plurality of circumferentially spaced, rotatable planet gears which are disposed between the sun gear and the toothed ring and which mesh therewith. The rotational force of the axle shaft is thus transmitted via the planet gears acting on the toothed ring to the hub, causing rotation of the latter.

The hub and spindle body have interiors free from internal obstructions preventing outward removal of the hub and spindle as a unit from the axle shaft and housing, thereby permitting the hub and spindle to be removed as a unit for repair or replacement. The interiors of the hub and spindle body are also free of obstructions preventing axial outward removal of the sun gear therefrom.

The spindle body is provided with circumferential interior and exterior seals slidably sealing the spindle to the axle housing for relative pivotal movement and to the outer portion of the axle shaft for relative rotational movement. The space provided between the circumferential seals and interior surfaces of the axle housing and spindle serves as a lubricant enclosure for lubricating the universal joint of the axle shaft.

A cap is mounted to the outer opening in the hub, and has an inward projection preventing outward axial movement of the axle shaft through the hub and spindle assembly. Removal of the cap provides access to the sun gear, which can then be removed from the axle shaft, and the hub-spindle unit can thereafter be removed from the axle housing as referred to above.

DESCRIPTION OF THE DRAWING

FIG. 3 is a broken away top view of the assembly of the invention showing a portion of the steering mechanism; and FIG. 4 is front view of the assembly shown in FIG. 3.

DESCRIPTION OF THE PREFERRED EMBODIMENT

Figure 1:
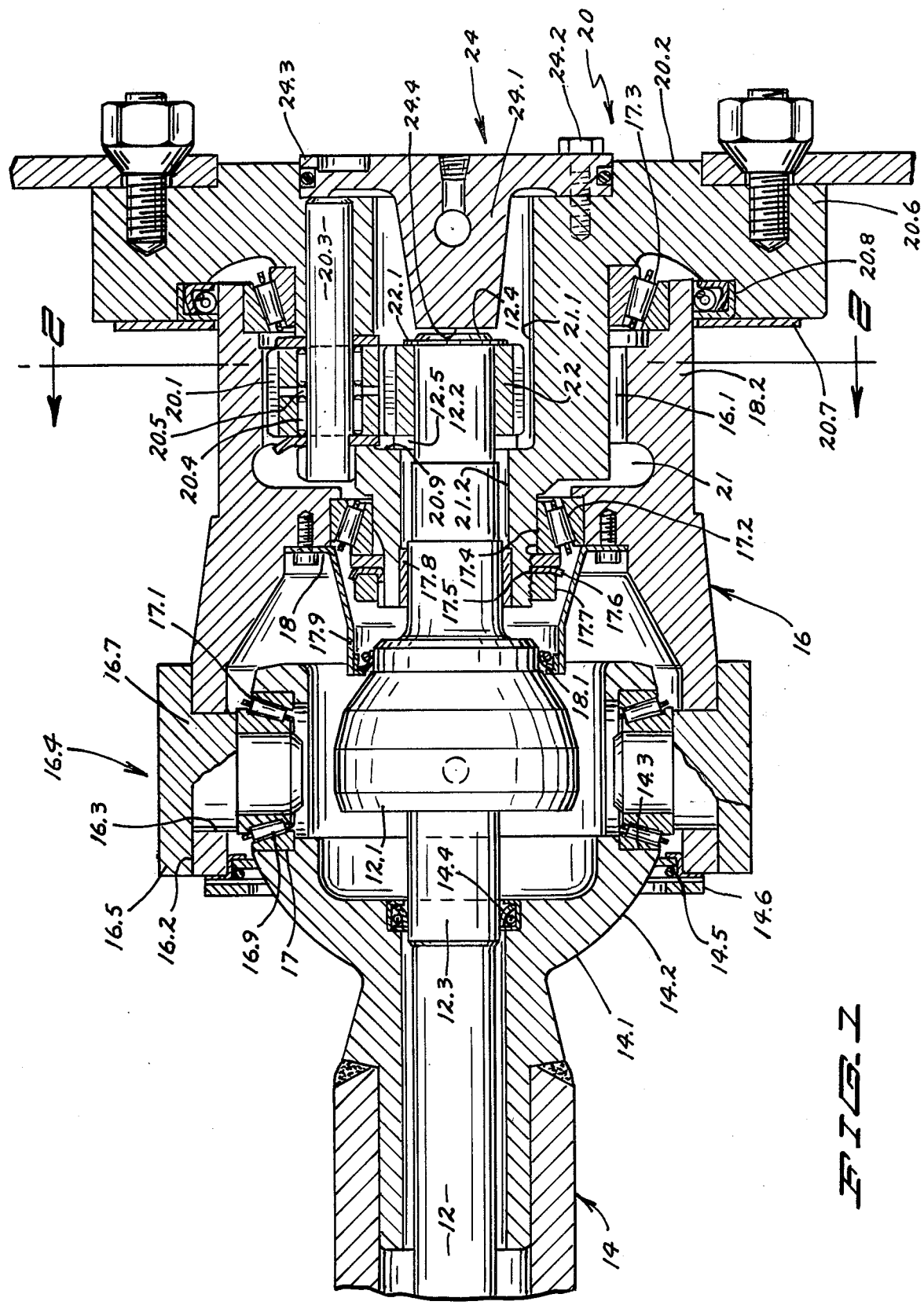
FIG. 1 is a broken away front view, in partial cross section, showing the hub assembly of the invention.

Broadly speaking, FIG. 1 shows an axle shaft 12 carried within an axle housing 14, the axle housing having at its outer end an axle housing head 14.1. A hollow, generally tubular spindle 16 is pivotally mounted at its inner end to the axle housing, and rotatably supports a hub 20 adjacent its outer end. The axle shaft 12 has a universal joint 12.1 centered on the pivotal connection between the spindle 16 and axle housing 14. The outer portion 12.2 of the axle shaft is provided with a removable sun gear 22. The interior surface of the spindle gear is provided with an integrally formed ring of teeth 16.1 surrounding but spaced radially outwardly from the sun gear, and the hub carries a plurality of circumferentially spaced planet gears 20.1 disposed between the sun gear and the toothed ring and meshed therewith. A removable cap 24 is provided to cover the outer opening in the hub and includes an inner projection 24.1 preventing outward escape of the axle shaft.

Referring now briefly to FIGS. 3 and 4, a steering cylinder rod 25 is pivotally mounted to the spindle 16 to pivot the spindle-hub unit about the generally vertical axis of the pivotal joint between the spindle and axle housing, as referred to above. A tie rod 26 is also pivotally mounted to the spindle as shown, and extends to a similar spindle (not shown) on the opposite side of a vehicle or the like to provide unison steering movement of the spindle-hub units and tire rims (designated "R") or the like borne by the hubs.

Referring now specifically to FIG. 1, the axle housing head 14.1, which is welded to the axle housing, is of generally tubular configuration and has an outer end of expanded diameter providing an outer spherical surface 14.2 coaxial of the axle shaft 12. Adjacent its outer end, the housing head 14.1 is provided with a pair of diametrically opposed and aligned apertures 14.3. An annular lubrication seal 14.4 rotatably seals the axle housing head to a portion 12.3 of the axle shaft having a slightly expanded diameter.

Within the expanded diameter portion of the axle housing head, the axle shaft is provided with the universal joint 12.1, the latter joint permitting torque of the axle shaft to be transmitted to the outer portion 12.2 thereof, but yet permitting the outer portion of the shaft to continuously pivot through, for example, an angle of about 35° with respect to the axis of the axle shaft in the axle housing. A variety of universal joint couplings are known to the art and are suitable for use in the present invention such as a constant velocity joint sold by the Dana Company under the trademark CON-VEL. A sun gear 22 is mounted to the outer end portion 12.2 of the axle shaft for rotation therewith. The outer portion 12.2 of the axle shaft, and the inner periphery of the sun gear may have mating, axial splines, or the sun gear and axle shaft may be keyed or otherwise held together.

The inner end portion of the spindle 16 is generally bell shaped and overlies the expanded diameter portion of the axle housing head 14.1. The outer surface of the spindle is provided with diametrically opposed knuckles including reinforced outer flat surface 16.2, the walls of the spindle at the flat portions having radial through holes 16.3. A pair of conventional axle trunnions 16.4 are provided, each trunnion comprising a flange 16.5, and a pin which extends outwardly at right angles to the flange, and includes a central portion 16.7 which fits snugly in the through hole 16.3 of the spindle, and a cylindrical end 16.8 projecting radially inwardly of and clearing the aligned aperture 14.3 in the axle shaft. The trunnions 16.4 are removably mounted to the spindle flat by, e.g., bolts (not shown). The cylindrical end 16.8 of the trunnion is mounted within the aperture 14.3 of the axle housing head by means of antifrication bearings. In FIG. 1, for example, a ring of tapered roller bearings 16.9 are supported exteriorly by a roller bearing cup 17 mounted in the periphery of the aperture 14.3 of the axle housing head and internally by a roller bearing cone 17.1 mounted to the cylindrical end 16.8 of the trunnion.

The axis of rotation of the spindle with respect to the axle housing, as provided by the trunnion and antifriction bearing assembly referred to above, passes through and is radially aligned with the universal joint 12.1 of the axle shaft. It will also be understood that the trunnions 16.4 may be removed simply by unbolting them from the associated portions of the spindle.

Because of the compact nature of the spindle with its integrally formed knuckles and its resultant freedom from bulky bolted joints, the axis of rotation "A" (FIG. 4) of the hub-spindle unit taken through the trunnions 16.4 may be spaced closely to the centerline "C" of the tire track. In this manner, when the hub-spindle unit is pivoted about the axis "A", the tire itself is bodily traversed through only a relatively short arcuate path, and less force is required for steering.

The generally tubular hollow hub 20 has an axial inner bore adapted to permit the hub to fit freely over the outer portion 12.2 of axle shaft, the hub being received within the outer open end of the spindle as shown in FIG. 1. Inner and outer antifriction bearing rings, shown generally as 17.2, 17.3, are provided between the hub and the spindle and are spaced axially to insure smooth coaxial rotation of the hub with respect to the spindle. The bearing rings 17.2, 17.3 may be tapered roller bearings, as depicted in FIG. 1, and may be held in place with the typical roller bearing cups and cones. The antifriction bearing rings 17.2, 17.3, it will be noted, are disposed on opposite sides of the toothed ring 16.1 formed in the interior surface of the spindle. The roller bearing cone 17.4 supporting the bearing ring 17.2 is supported axially on the hub by washers 17.5, 17.6 which in turn are held in place by locknut 17.7. A bushing 17.8 is carried in the inner portion of the hub to assure true axial rotation of the outer axle shaft portion 12.2 with respect to the hub.

A generally cone-shaped, thin-walled retainer seal 17.9 is bolted about its periphery 18 to the interior surface of the spindle. The seal thence extends axially and radially inwardly and terminates in a circumferentially seal 18.1 which bears radially inwardly upon the periphery of the axle shaft axially outwardly of the universal joint 12.1. From FIG. 1, it will be understood that the interior walls of the spindle and axle housing, which are rotatably sealed to the axle shaft by the circumferential seals 14.4, 18.1, define an enclosure which may contain grease or other lubricant. The retainer seal with its circumferential seal 18.1, as will be explained, also serves to separate the last-mentioned grease enclosure from another lubricant enclosure for lubricating the antifriction bearings 17.2, 17.3 and the sun and planet gears.

The body of the hub 20 extends axially outwardly of the spindle, and terminates outwardly in a head 20.2 of enlarged diameter. Extending inwardly from the head, and parallel to the axis of the outer portion of the axle shaft 12.2, are a plurality of pins 20.3, each carrying a planet gear 20.1 meshing with the teeth of the sun gear 22 and with the teeth of the toothed ring 16.1 formed integrally on the inner surface of the spindle 16. The planet gears are mounted to the pins 20.3 by means of circumferential rings of axially extending needle bearings 20.4. As depicted in FIG. 1, two coaxial rings of needle bearings are employed, separated by a central bearing spacer 20.5. Desirably, three planet gears, equiangularly spaced about the circumference of the toothed ring 16.1 of the spindle, are employed.

The head 20.2 of the hub is provided with a peripheral lip 20.6 which extends inwardly a short distance along but spaced from the outer surface 18.2 of the spindle. The lip 20.6, at its inner end, is provided with an annular plate 20.7 forming with the lip and the adjacent surface 18.2 of the spindle an annular recess within which is mounted a ring seal 20.8 rotatably sealing the hub to the spindle.

The outer end of the axial bore formed in the hub is closed by the cap 24 which is removably secured to the exterior of the hub by means of bolts 24.2. The cap is provided with a peripheral groove 24.3 within which is seated an O-ring or other annular seal providing a lubricant seal between the cap and the hub. The inward projection 24.1 of the cap is generally frustoconical in shape and extends inwardly from the inner surface of the cap, the projection terminating in a generally flat surface 24.4 which is generally parallel to and is closely spaced from the flat, transverse end 12.4 of the axle shaft. The projection 24.1 serves to prevent the axle shaft from moving axially outwardly when the cap is in place. It will also be noted that the axle shaft is provided with an annular spacer 12.5 engaging the sun gear and an inner shoulder 20.9 of the hub and maintaining the sun gear in place fully engaged axially with the planet gears. A snap ring 22.1 at the outer end of the axle shaft prevents the sun gear from moving axially outwardly of the shaft, the sun gear thus being held in radially alignment with the toothed ring 16.1 of the spindle.

Figure 2:
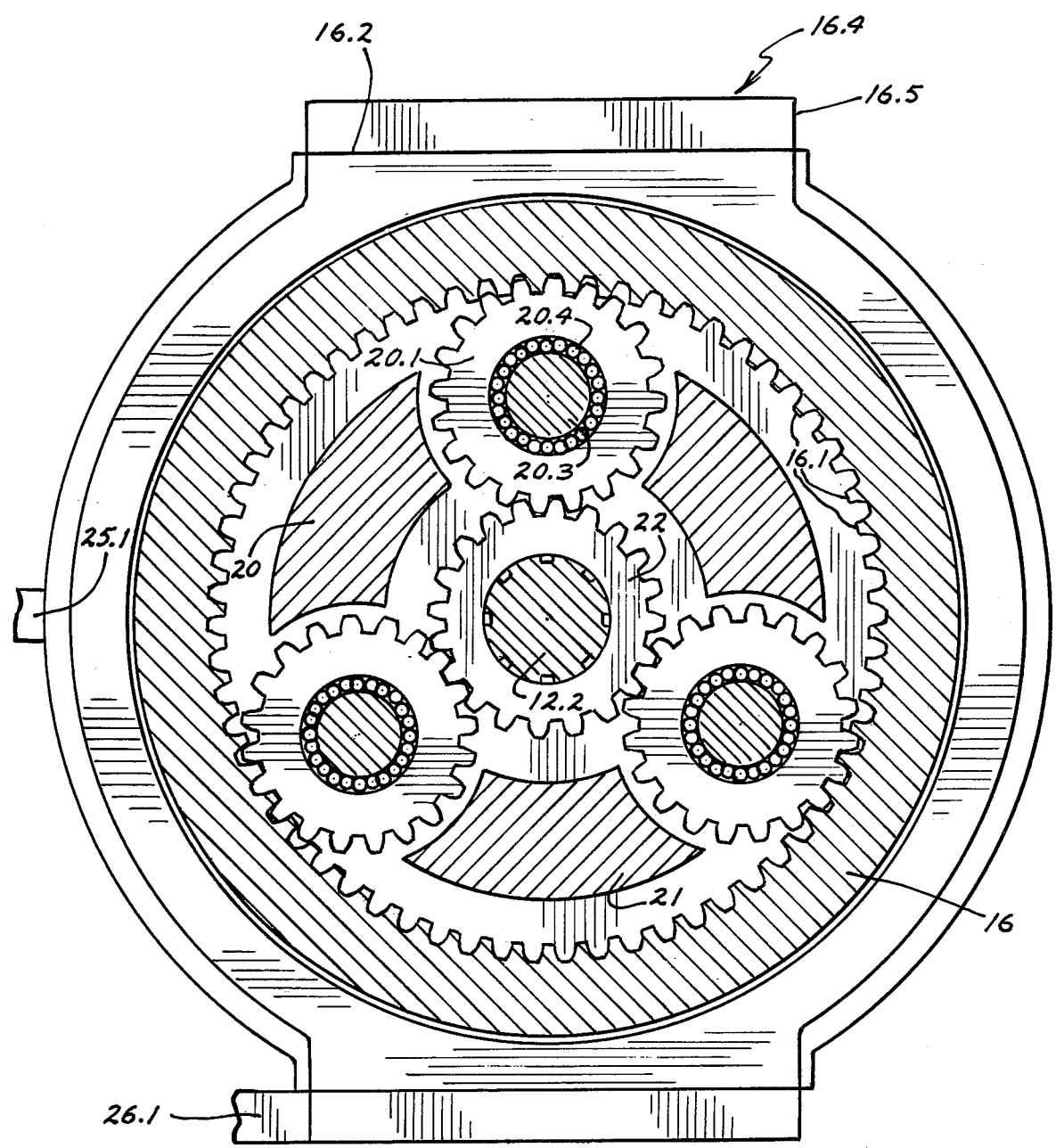
FIG. 2 is a cross-sectional view taken along line 2—2 of FIG. 1.

With reference to FIGS. 1 and 2, it will be noted that the spindle and hub have an annular space therebetween to provide a lubricant enclosure 21 which is sealed at its axially inward end by the retainer seal 17.9 and at its outer end by the circumferential seal 20.8, the latter enclosure being separated from the grease enclosure mentioned above. Referring particularly to FIG. 1, the inner bore 21.1 of the hub adjacent its outer end is of sufficient diameter to permit withdrawal of the sun gear 32 therefrom when the cap 24 has been removed. Further, the interior bore 21.1 of the hub adjacent its inner end, and that portion of the spindle body projecting axially inwardly from the hub, are free from obstructions preventing the spindle body and hub as a unit from being removed axially outwardly from the axle shaft when the sun gear 22 and the trunnions 16.4 have been unfastened and removed.

An outer annular seal 14.5 in a retainer 14.6 is removably bolted to the inner end of the spindle, and bears slidingly upon the spherical surface 14.2 of the axle housing head, thereby further sealing the grease enclosure and protecting the antifriction bearings 16.9 from contamination.

To disassemble the assembly shown in FIG. 1, the cap 24 is removed, the snap ring 22.1 holding the sun gear onto the axle shaft is unfastened, and the sun gear is drawn axially outwardly of the hub. The outer annular seal and retainer 14.5 and 14.5 are unbolted and removed, and the trunnions 16.4 are unbolted and removed. At this point, the hub and spindle assembly can be drawn axially outwardly from the axle shaft and housing for repair or replacement. To separate the spindle and hub, the locknut 17.7, the associated washers and the bearing cup 17.4 are removed, whereupon the hub may be pulled axially outwardly of the spindle.

Referring now to FIGS., 2, 3 and 4, an exterior mounting ear 25.1 is welded to or cast integrally with the outer surface of the spindle. The steering cylinder rod 25 is provided with a bifurcated end which is mounted to the ear 25.1 by means of pivot pin 25.2 to permit pivoting movement about a generally vertical axis, as is best seen in FIG. 4. Another mounting ear 26.1 extends to the side from the truunion flange 16.5, as shown best in FIGS. 2 and 4. Tie rod 26 has a bifurcated end which is mounted to the ear 26.1 by a pivot pin 26.2, similarly providing pivotal movement about a generally vertical axis. It will be understood that the pivotal axes provided by the trunnions and by the pivot pins 25.2, 26.2 are substantially parallel to one another.

Thus manifestly, I have provided a steering planetary hub assembly which is capable of being easily and readily assembled and disassembled and which is of simple but uniquely inexpensive construction. The steering knuckle receiving the trunnions, and also the toothed gear ring 16.1, are formed intergrally with the spindle, thereby simplifying construction and reducing cost. The unitery, integral construction of the knuckle-bearing spindle, without bolted joints, permits the pivotal axis of the attachment of the spindle to the axle housing to be closely spaced to the center line of the tire track, thereby affording ease of steering and providing minimal horizontal swinging movement of a tire when the latter is pivoted about the pivotal axis in a steering operation. The construction of the spindle and the hub permits the spindle and hub to be removed from the axle shaft and housing as a unit for replacement or repair.

While I have described a preferred embodiment of the present invention, it should be understood that varying changes, adaptations, and modifications may be made therein without departing from the spirit of the invention and the scope of the appended claims.

What I claim:

1. A planetary gear steering hub assembly comprising:
   a stationary axle housing;
   an axle shaft extending outwardly through the housing and having a universal joint spaced from its outer end and defining a pivotal outer shaft end portion;
   a sun gear removably and coaxially mounted to the outer end of the axle shaft;
   a hollow, generally tubular spindle body pivotally coupled at one end to the axle housing for pivotal movement about a generally upright axis, the spindle having adjacent its other end an interior surface having formed therein a toothed ring surrounding but spaced from the sun gear, the axle housing includes a spherical outer surface, and the spindle includes a seal slideably sealing engaging the spherical surface and a seal sealing the spindle to the outer end portion of the axle shaft axially inwardly of the sun gear;
   a hub rotatably mounted to and carried coaxially with the spindle, the hub extending outwardly of the spindle and carrying a plurality of spaced, rotatable planet gears disposed between the sun gear and the toothed ring and meshing therewith and includes an annular portion disposed between the axle shaft and the spindle, a first set of bearings axially inward of said ring rotatably mounting the annular portion of the hub adjacent its axially inner end to the spindle, bearing retaining means restraining the first set of bearings between the hub and the spindle and permitting separation of the same and a second set of bearings axially outward of said ring rotatably mounting the hub to the spindle at the outer end of the latter, the first and second sets of bearings being spaced axially to maintain coaxial rotation of the hub with respect to the spindle and balance forces acting on the first and second sets of bearings; and,
   a removable cap covering the outer open end of the hub providing ease of accessibility of the sun gear, which can then be removed from the axle shaft and the hub and spindle unit which can then be removed from the axle housing and including means restraining outward axial movement of the axle shaft.

2. The assembly of claim 1 wherein the hub includes a plurality of axially inwardly extending pins carrying the planet gears, and wherein the hub and spindle body have interiors free from internal obstructions preventing outward removal of the hub and spindle body as a unit from the axle shaft and housing.

3. The assembly of claim 1 wherein the restraining means comprises a projection extending axially inward of the cap and terminating closely adjacent the outer end of the axle shaft.

4. The assembly of claim 1 wherein the body of the spindle is free from obstructions preventing removal therefrom of the inwardly extending annular portion of the hub.

5. The assembly of claim 1 in which the spindle and the axle housing have mating circumferential ends fitting one within the other, and including diametrically opposed trunnions pivotally joining the circumferential ends of the spindle and axle housing.

6. A planetary gear steering hub assembly comprising:
- a stationary axle housing;
- an axle shaft extending through the housing and having a universal joint spaced from its outer end and defining a pivotal outer shaft end portion;
- a sun gear removably and coaxially mounted to the outer end of the axle shaft;
- a hollow spindle body having an inner circumferential end defining diametrically opposed knuckles, and a pair of diametrically opposed trunnions pivotally mounting the knuckles of the spindle to the axle housing for pivotal movement about a generally vertical axis passing through the universal joint of the axle shaft, the spindle having an interior surface adjacent its axially outer end with an integrally formed toothed ring formed therein and surrounding but spaced from the sun gear, said interior surface being free of obstructions preventing removal of the spindle from the axle housing upon removal of the trunnions;
- a hub having an inwardly extending annular portion disposed between the axle shaft and the spindle, the hub extending axially outwardly of the spindle and terminating in a radially enlarged head, and including an annular portion disposed between the axle shaft and the spindle, a first set of bearings axially inward of said ring rotatably mounting the annular portion of the hub adjacent its axially inner end to the spindle, bearing retaining means retaining the first set of bearings between the hub and the spindle and permitting separation of the same, and a second set of bearings axially outward of said ring rotatably mounting the hub to the spindle at the outer end of the latter, the first and second bearings being spaced axially to coaxial rotation of the hub with respect to the spindle and balance forces acting on the first and second set of bearings to maintain coaxial rotation of the hub with respect to the spindle, the hub including a plurality of axial inwardly extending pins rotatably mounting planet gears with the latter disposed between, and meshing with, the toothed ring of the spindle and the sun gear, the hub having an axial bore free from obstructions preventing outward axial removal of the sun gear therefrom and preventing the hub from being removed axially outwardly of the axle shaft;
- seal means comprising circumferential seals sealing the axle housing to the axle and the hub to the spindle, and a retainer seal attached to the interior surface of the spindle and terminating in a circumferential seal which bears radially inwardly upon the periphery of the axle shaft axially outward of the universal joint; and,
- a removalbe cap covering the outer end of the hub providing ease of accessibility to the sun gear and the hub spindle unit.

7. The planetary gear steering hub assembly of claim 6 wherein said retainer seal is cone-shaped and thin-walled.

* * * * *